United States Patent [19]

Tuhro

[11] Patent Number: 5,177,617
[45] Date of Patent: Jan. 5, 1993

[54] BOOK EDGE COPIER INVERSION SORTING

[75] Inventor: Richard H. Tuhro, Webster, N.Y.

[73] Assignee: Xerox Corporation, Stamford, Conn.

[21] Appl. No.: 779,545

[22] Filed: Oct. 18, 1991

[51] Int. Cl.$^5$ ............... H04N 1/21; H04N 1/387; G03B 27/30
[52] U.S. Cl. .................. 358/296; 358/444; 355/25; 355/82; 395/115; 395/137
[58] Field of Search ............ 358/296, 443, 444; 355/25, 82; 395/115, 137

[56] References Cited

U.S. PATENT DOCUMENTS

| | | | |
|---|---|---|---|
| 4,145,138 | 3/1979 | Mercure | 355/25 |
| 4,334,765 | 6/1982 | Clark | 355/25 X |
| 4,703,515 | 10/1987 | Baroody, Jr. | 382/46 |
| 4,727,397 | 2/1988 | Stemmle | 355/24 |
| 4,876,608 | 10/1989 | Eaton | 358/443 |
| 4,947,344 | 8/1990 | Hayashi et al. | 395/137 |
| 4,970,661 | 11/1990 | Tsuzuki et al. | 395/115 |
| 4,972,271 | 11/1990 | Koumura | 355/25 X |
| 5,038,218 | 8/1991 | Matsumoto | 395/137 X |
| 5,105,283 | 4/1992 | Forest | 358/444 X |

OTHER PUBLICATIONS

Modern Optical Engineering, "The Design of Optical Systems", W. J. Smith, McGraw-Hill, pp. 86–93.

Primary Examiner—Benjamin R. Fuller
Assistant Examiner—Eric Frahm
Attorney, Agent, or Firm—Mark Costello

[57] ABSTRACT

A method and apparatus improving the use of a book edge copier, in which for book edge copying, a control selection is provided so that for every other copy made, the copying process is altered to invert the copy to produce a set of copies with the same top to bottom alignment.

16 Claims, 4 Drawing Sheets

BOOK EDGE COPIER INVERSION SORTING

The present invention relates generally to a system for aiding book copying in electronic and light lens copiers, and more particularly to an arrangement for automatically rotating images as they are copied from a book.

INCORPORATION BY REFERENCE

The following patents are incorporated by reference for their teachings: U.S. Pat. No. 4,727,397 to Stemmle and U.S. Pat. No. 4,703,515 to Baroody, Jr.

BACKGROUND OF THE INVENTION

A photocopying machine or image input terminal with a platen can be difficult to use with books, especially books with thick bindings. This problem is usually addressed by incorporation of a book edge at one edge of the platen, such as in the Xerox 5042 BookSaver Copier. This edge allows the half of the book not being copied to hang over the edge of the machine so that the book binding is not compressed against the platen, thereby protecting the book binding and allowing ease of page by page copying. As a book is copied from page to page, the book must be rotated by 180° in the progression from left page to right page. This results in every other page having an inverted image with respect to the previous page. If no corrective action is taken, the output document pages from the copier or scanner are alternately inverted.

U.S. Pat. No. 4,727,397 to Stemmle addresses this issue for military style duplex copying, where the top to bottom alignment of images on a document is in a direction parallel to the path of travel of the sheet through the copier, by proposing that in a copier which is already provided with a duplex tray, the duplex tray can be arranged to rotate by 180° for each sheet received therein, with the eventual result that upon completion of a set, on each side of the duplex document, the image has correct top to bottom orientation. While this is undoubtedly an effective method, it is somewhat mechanically cumbersome.

Image rotation is well known in the art of electronic copying, as taught, for example, in U.S. Pat. No. 4,703,515 to Baroody, Jr. wherein bitmap data representing an image can be rotated in a fairly efficient manner as required. That patent describes a significant number of rotation methods, which can accomplish bitmap rotation by 180°.

Less well known, but clearly available from the art, is the ability to rotate an image optically, or by lenses, prior to projecting the image onto either a sensor or a photoreceptor of a light lens copier. Thus, for example, as shown in the text, *Modern Optical Engineering*, "The Design of Optical Systems", by W. J. Smith, McGraw-Hill, the use of a Dove, Porro, or Abbe prism may be used to rotate the image as required.

It would be highly desirable to provide a digital or light lens copier mode of operation which automatically or in response to a simple control signal produces a collated copy set or electronic image set from a book at a book edge copying arrangement.

SUMMARY OF THE INVENTION

In accordance with the invention, there is provided method and apparatus improving the use of a book edge copier, in which for book edge copying, a control selection is provided so that for every other copy made, the copying process is altered to invert the copy to produce a set of copies with the same top to bottom alignment.

In accordance with one aspect of the invention, in a digital copier, in which book edge copying is provided, selection of book copying is provided by reversing the direction of relative movement between the image and the scanning member, and for each line of scanning information including pixels $1-N$, reversing the order of the pixels to $N-1$, thereby providing image rotation by 180° in the acquisition of the image information, such action instituted on an every other imaging step basis, in response to a control signal indicating that book copying is required. Thus, upon selection of book style copying, and first placement of the first page to be copied from a book, and selection of book copying, the imaging process provides a first scan operating in accordance with a first standard imaging procedure and, for the second scan, which will be performed on the then rotated book, provides a second scan in reverse direction and with inverted data acquisition, thereby providing rotated image data acquistion, to provide 180° image rotation in image acquisition.

In accordance with another aspect of the invention, where it is not desirable to reverse the scanning direction, or the image information acquisition process, a rotation circuit such as that provided by U.S. Pat. No. 4,703,516 to Baroody may be implemented on image information acquired during a normal scanning process, on an every-other-page basis, so that the same 180° every-other-page rotation is provided.

In accordance with another aspect of the invention, for copying simplex documents having a top to bottom image orientation parallel to the path of sheet travel through the copier, there is provided a method for duplex copying such sheets in which every other sheet is rotated with respect to the previous sheet, to provide correct copy output top to bottom orientation.

In accordance with still another aspect of the invention, in a light lens copier, wherein there is provided an imaging arrangement for projecting an image onto an imaging member, which through an electrostatographic process, may eventually be developed, and the developed latent image transferred to a transfer member, there is provided a secondary lens arrangement, mechanically interposable in the path of the image optics arrangement, which provides 180° image rotation as part of the imaging function.

These and other objects of the invention will become apparent from the following description taken together with the drawings in which.

Figure 1:
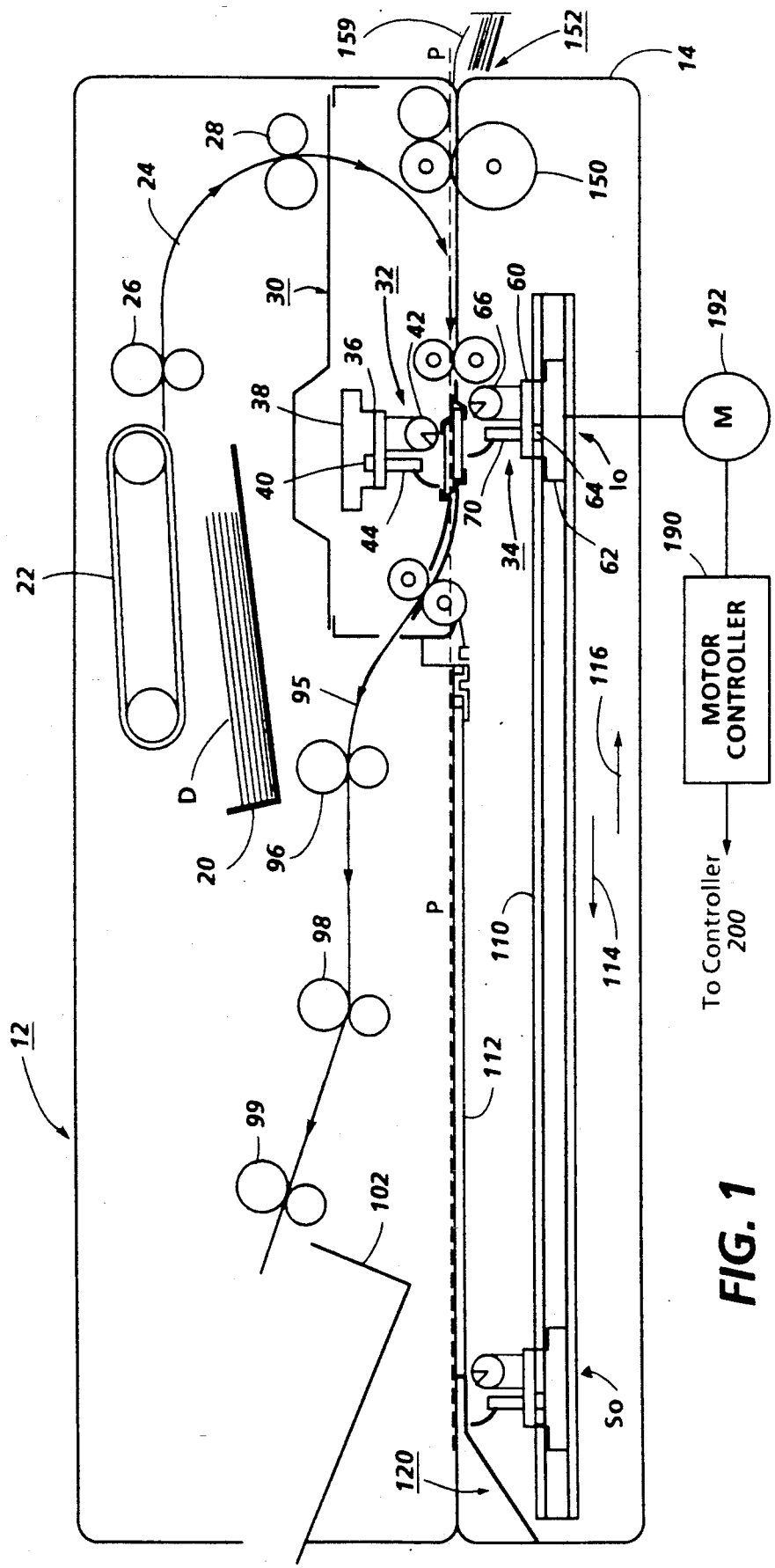
FIG. 1 shows a scanning arrangement, with a book supporting copying platen, and moving scanning element, in which the present invention may be implemented.

Referring now to the drawings where the showings are for the purpose of illustrating a preferred embodiment of the invention and not for limiting same, FIG. 1 shows a raster input scanner in accordance with the invention, and generally as described in U.S. Pat. No. 4,743,974, for producing an electronic representation of an image of a document. As used hereinafter, document refers to an image bearing original from which copying is desired. "Documents", in this case, comprise books which are bound sets of documents and other image supporting substrates such as paper, transparencies or other individual pieces of flimsy material. "Image" as used herein refers to the information on the document, for which scanning is desired, and which will be in some manner copied to another substrate or to an electronic storage medium. "Scanning" as used hereinafter refers to the relative movement of photosensitive sensors with respect to documents for the purpose of acquiring an electronic representation of the image or information about the image.

Raster input scanner 10 may be comprised of upper and lower frame members 12 and 14. Upper and lower frame members 12 and 14 may be generally rectangular, box-shaped elements connected by a hinge member (not shown) along lower and upper rear edges of frame members 12 and 14, respectively. Upper and lower frame members 12 and 14 are separable in a clam shell fashion at the hinge member to allow access to the area thereinbetween as will be hereinafter described.

Upper frame member 12 is provided with a document input tray 20 for holding a stack of documents such as cut sheets of paper face-up in the document tray from which data acquisition is desired. Document input tray 20 is provided with a document feeder 22 for feeding documents out from document input tray 20. Document feeder 22 may be a well known top feeding vacuum corrugated feeder found in standard document feeders for light-lens type copiers for feeding documents in a 1−N order. Documents are directed by document feeder 22 to an input sheet path 24 to be directed to a scanning position at scanning station 30. Scanning station 30 is comprised of upper and lower scanning elements 32 and 34. Upper scanning element 32 is fixed in position with respect to sheet path 24, mounted on upper frame member 14, and is provided with frame 36, scanning array support member 38, scanning array 40, lamp assembly including lamp 42 and and lens 44.

Lower scanning element 34 is also provided with a frame 60, scanning array support member 62, scanning array 64, lamp assembly including lamp 66 and and lens 70. The primary difference between the two scanning elements is that the lower scanning element 34 is arranged in a position opposite that of upper scanning element 32, in order to scan images on a side of the document opposite to that scanned by the upper scanning element 34. The two documents together form a scanning station through which documents may be transported for scanning both sides of the document.

Scanning element 32 is also supported for reciprocating movement as will be hereinafter described on support rails 110. Support rails 110 are provided in lower frame portion 14, parallel to the direction of document travel through scanning station 30, and located generally on either side of the path of sheet travel. In FIG. 1, only a single support rail 110 is shown, but usually at least two will be provided. Scanning element 34 may be provided with bearings or bushings 62 to reduce sliding friction between scanning element 34 and the rails 110. Rails 110 support the scanning element 34 for movement across the length of lower frame portion 14 slightly below a scanning platen 112. Scanning platen 112 is a generally rectangular member having a size allowing the placement of documents thereon for scanning by the scanning element 34 as it moves across the length of the lower frame 14. Scanning platen 112 is supported at its edges on lower frame 14. Scanning platen 112 supports documents not readily fed from document input stack 20, such as pages of books, single sheets in bound documents, documents too thick, fragile or damaged to be fed along paper paths 24 or 95. At the outboard edge of the lower frame portion 14, is provided a book edge arrangement, which allows books to be supported with one side thereof supported on platen 112, and the other side thereof, hanging over the edge of the machine, yet partially supported, on an edge 120.

In normal operation, upon selection of platen copying, i.e., copying of images of documents placed on scanning platen 112, lower scanning element 34 moves from an initial position $I_o$, generally adjacent the scanning station end of the scanning platen 112, across the length of lower frame 14 and scanning platen 112 in the direction of arrow 114 to a start of scan position $S_o$. Generally, during this initial movement, scanning array 64 is inoperative for acquiring image data, imaging scanning is preferably accomplished by movement of the lower scanning element from position $S_o$ back to position $I_o$ in the direction indicated by the arrow 116. However, in accordance with the present invention, in certain circumstances, image data may be acquired during movement from $I_o$ to $S_o$, as will hereinafter be described.

Scanning element 34 is driven in its movement by any suitable drive arrangement providing a smooth, non-vibrating motion across the lower frame, such as for example, well known pulley and cable systems or equally well known lead screw drive systems. Various vibration damping arrangements may be provided to damp undesirable motion, such as bearings, bushings or cushions. In standard operation the scanning element is driven from position $S_o$ to position $I_o$. As the scanning element is moved across the platen, the sensors of the sensor array are repeatedly exposed to incremental slices of the document, producing charge information indicative of the image on the document for use in assimilating an electronically stored image of the document. Such scanning operation is in response to signals from a controller 200, which directs motor control signals to a motor controller 202, which in turn, drives motor 204, driving the scanning mechanism (not shown).

Figure 2:
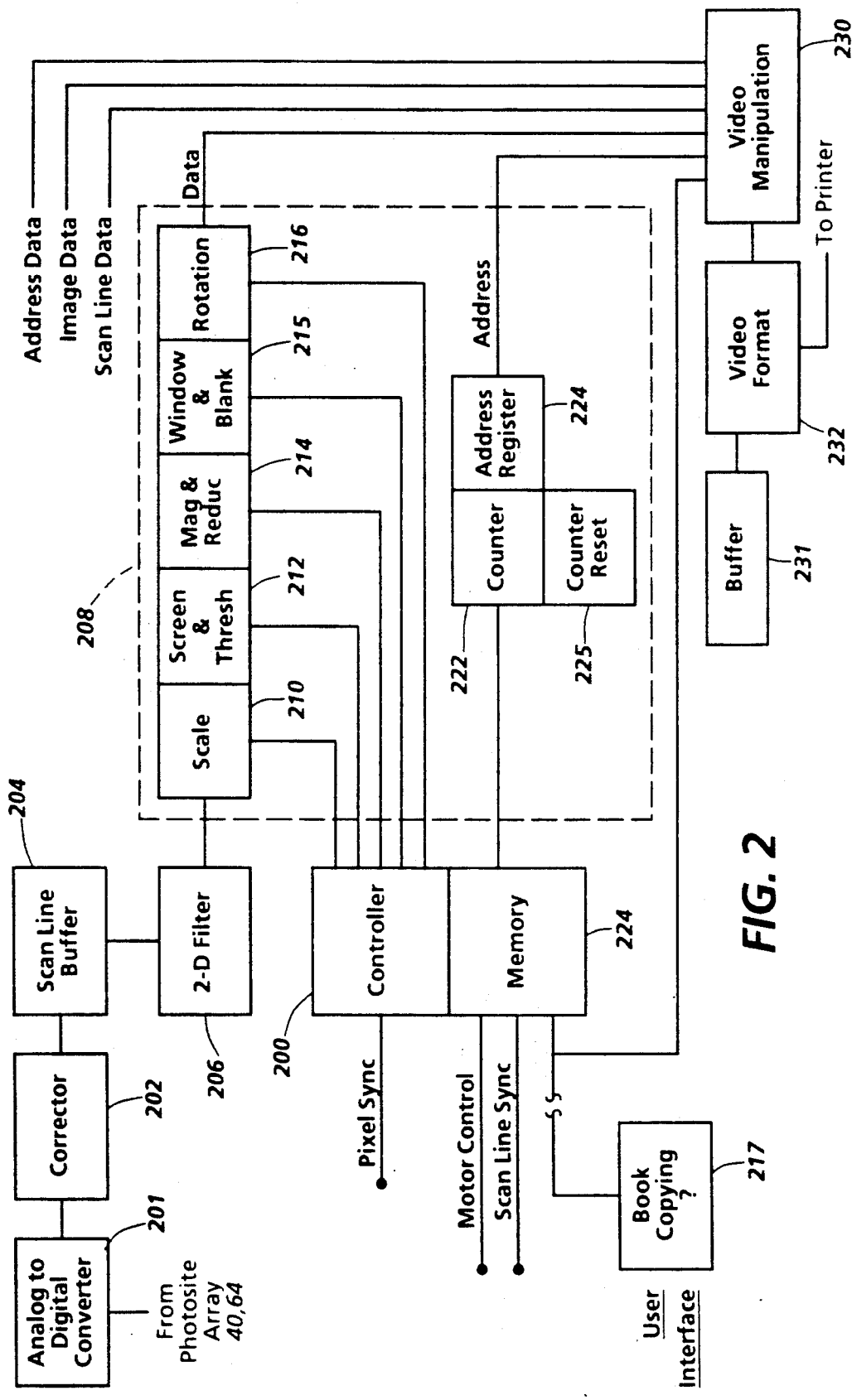
FIG. 2 shows a functional block diagram showing the flow of acquired date, in which the present invention may be implemented.

Data from the array may be treated in a number of ways, but in accordance with the present invention, and as shown in FIG. 2, is treated as in accordance with U.S. Pat. No. 4,876,608 to Eaton, which shows a functional block diagram of an image processing arrangement wherein image data is periodically removed from photosites in accordance with the pixel synch signals and directed to analog to digital converter 201, functionally adjacent to the scanning array, for the conversion of analog data to an 8-bit digital data byte, for example. At corrector 202, the now-digital data is normalized against a predetermined calibration to account for discrepancies in the sensitivity of each photosite. The data may be deskewed to account for the order in which the data is derived from each photosite array and correction algorithms account for bad photosite element locations in the array by various interpolations and bad pixel discarding routines. Corrected data is stored into scanline buffer 204 which stores a plurality of scanlines for operation of the two dimensional filter 206. Two dimensional filter 206 detects and converts halftone screen data derived by the scanner into gray data for the prevention of moire effects. Because filtering routines useful in the conversion require information about the neighbors to any particular pixel, scanline buffer 204 provides two dimensional filter 206 with data for groups of adjacent scanlines. It will, of course, be appreciated that while the data line is illustrated as a single line, the 8-bit data byte may be transmitted from device to device along 8 parallel data transmission lines. One dimensional image processor 208 is provided for operation on the data along each scanline, performing many common operations expected in image processing devices. Each of several processing functions circuits including, for example, scaling circuit 210, screening and thresholding circuit 212, and magnification/reduction circuit 214, windowing and blanking circuit 215, and rotation circuit 216 are enabled by controller 200 for operation on data passing through one dimensional image processor 208. Controller 200 is responsive to operator commands through a user interface (UI) 217 and selection of processing functions to cause controller logic to enable processing function circuits 110, 112, 114, 115 and 116. In the drawings, UI 117 is shown illustrating the selection of book copying, although a user interface will undoubtedly provide many other functions.

Figure 3:
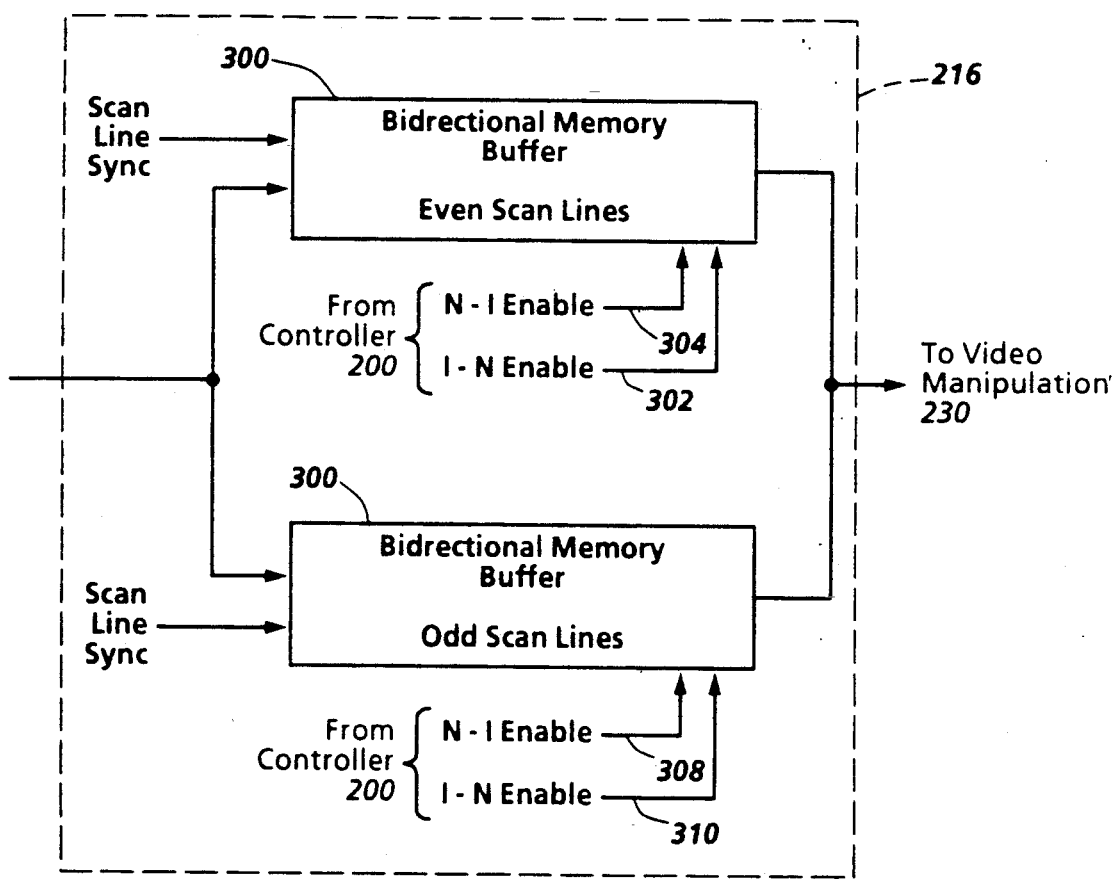
FIG. 3 is block diagram showing the conversion of $1-N$ data to $N-1$ data.

As shown in FIG. 3, rotation block 216 may in the present case include two bidirectional scan line buffers or memories 300 and 302. First buffer 300 receives a scanline of data in the order in which it is read to it, that is, from 1−N. When buffer 300 has been filled, buffer 302 is enabled to read data in 1−N order. Data is enabled to subsequently read from first buffer 300 to an output N−1 order. When completed, data is read from buffer 302 to an output in N−1 order. The scheme described thus requires minimal throughput loss. If data has been acquired through movement of the scanning element, from $I_o$ to $S_o$, in contra distinction to normal operation or standard operation from $S_o$ to $I_o$, and, this device has been enabled, data is now in a reversed format, i.e., 180° rotated. Writing by each buffer to an output is enabled by controller 200, in accordance with signals to 1−N ENABLE (304, 308) or N−1 ENABLE (306, 310) generated, which allows data to be read out of the buffer in order for non-rotation, or rotation, respectively.

In accordance with the invention and with reference to FIGS. 1, 2 and 3, when Book copying is selected via UI 217, a simple program for book copying is thereby enabled, which causes every other image copied to be rotated. Various alternative embodiments may be implemented, including a scheme that tells the processor in accordance with user selection of a similar command whether a "left page" or a "right page" is being copied. Using this information, rotation will always occur when "right page" is selected, so that with respect to the other page, the output is always correct. Conveniently, the selection of the book copying program will also be accompanied by a set of user instructions at the user interface, which advise the operator on the book copying process, and particularly that skipping a page will cause the image orientation to vary. Additionally, in book mode copying, in systems distinct from that described, where scanning movement and data acquisition are always started from the platen edge away from the book edge, during book mode copying, after the first scan, the scanning element may park at the platen edge adjacent the book edge in preparation of the second reversed scan.

While the rotation of the image may be accomplished by block 216, as described, the described imaging processing arrangement, pixel clock and scanline synch signals are directed through controller 20 to control various image processing operations at appropriate points in the stream of data. One dimensional image processor 106 also produces an address for each image data byte in a scanline, as additional data for combination with each image data byte passing therethrough. Counter 222 is driven by controller 200 in accordance with a clocking or pixel synch signal to controller 200 to produce a multi-bit address designation or token indicative of the position along the scanline of the image data byte passing through one dimensional image processor 208. Counter 222 incrementally loads latch or address register 224 with an address token for output with the image data byte. Periodically, in accordance with the scanline synch signal, the counter is reset to indicate a new scanline, by counter reset 225. The result is that each address data byte has associated with it an address defining an ultimate location along the scanline as well as information regarding its intensity. Each data byte, now position-defined by an address token, is passed through a video manipulation device 230. At this device, image manipulation desired by a user may be applied to the data. New image data, or new address data may be supplied by varying, respectively the value of the image data, or the value of the address token. Subsequent to video manipulation, data bytes manipulated in the video manipulation device 130 are transferred to the video format device 132. Video format device 132 combines the address data in buffer 134 combining data in accordance with the correct position along the scanline and directing the address data bytes to the final addresses for transmission to the printer or other device along line 136. In accordance with the invention, by simply providing new address information for each image data byte, that is, replacing addresses 1−N with addresses N−1 at video manipulation arrangement 130, the same effect as is previously described may be accomplished.

Of course, other image processing arrangements are possible. Thus, for example, instead of operation on a line by line scanning arrangement, particularly in the case where there is no easy provision for scanning in the direction reverse to the standard direction of scanning, image rotation may be provided as a separate function in the image processing arrangement. In accordance with the invention, an image rotation arrangement as taught by U.S. Pat. No. 4,703,515 to Baroody, Jr. incorporated herein by reference, may be provided to accomplish the present invention. In such a case, a software or hardware implemented rotation by page-wise manipulation of data may be selected.

Figure 4A:
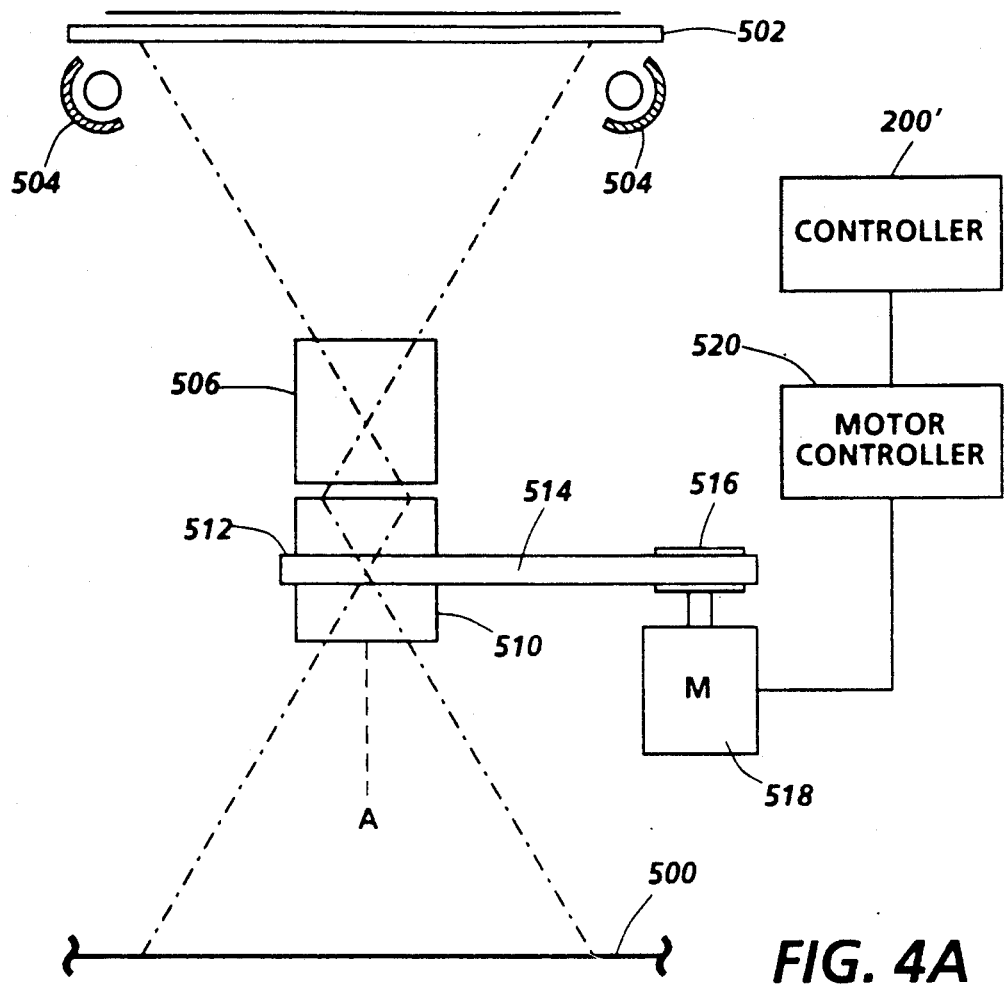
FIGS. 4A and 4B show the use of the present invention in an electrophotographic device.
Figure 4B:
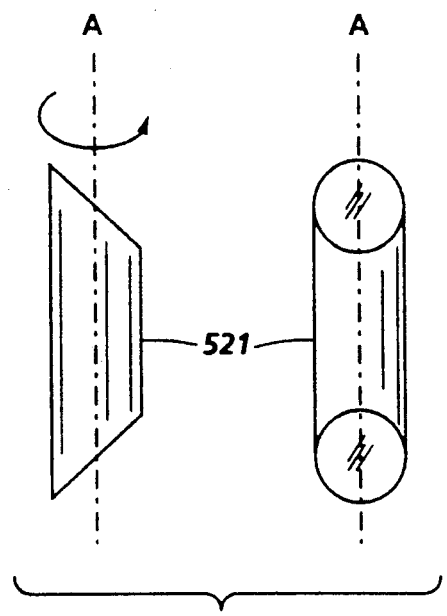

In accordance with another aspect of the invention, in a light lens copying arrangement, where an image is directed from a platen directly to a photosensitive surface, there is provided an analogous feature of image rotation to accomplish production of a set of copies that have correct top-to-bottom image orientation in book copying. With reference to FIG. 4, a full-frame exposure station of an otherwise standard electrophotographic copier, such as the Xerox 5090 Duplicator is illustrated, including a photoreceptor 500, onto which an image of a document placed face down on platen 502 is focused. The document is illuminated with lamps 504, and the image is focused on photoreceptor 500 with lens 506. The lens and illumination arrangement is located within an integrating cavity that serves to reflect light towards the document for maximum illumination, and confine the light to desired areas. In accordance with the invention, for book copying, a Dove prism (housing 510 only shown, in FIG. 4A) is interposed in the path of light from the document to the photoreceptor to invert the image as required.

When a dove prism is rotated by x° about its long axis A, an image directed thereto is rotated by an amount 2x°. Thus, for every 90° of rotation, the image is rotated by 180°. Because of this relationship, dove prism 511, which has a shape best seen in FIG. 4B, may be supported within the generally cylindrical housing 510, in the optical path in a manner similar to that of focusing lens 506, and mounted for rotation about axis A, via a belt and pulley arrangement in which a belt receiving groove 512 may be formed in dove prism housing 510, for receiving a belt 514 also entrained about motor pulley 516, driven by motor 518. A motor controller produces signals driving the motor in accordance with controller 200', which operates in accordance with a preprogrammed routine upon selection of alternate page copying at a UI. Of course numerous other belt, timing belt or gearing arrangements may be employed for the rotation of dove prism 511 about its axis.

It will of course be appreciated that while full frame copying is described, a dove prism could be combined with a reverse scanning arrangement to provide inverted light lens copying, in much the same way as described for electronic scanning, where the dove prism takes the place of the 1−N/N−1 inverting circuitry. Additionally, there are several well known equivalents to a dove prism, including Amici prisms, Porro prisms, Pecham prisms, Abbe prisms, and V-prisms, or a K-mirror arrangement. There are variants of these arrangements as well.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. In a document scanning system for deriving an electronic representation of an image on a document, having a scanning position at which a bound document set may be supported for scanning, the bound document set having at least one first and second documents with opposed image surfaces, and the scanning position supporting only a single document thereof for scanning, whereupon for second document scanning, the bound document set is manually rotated with respect to the scanning position to place the second document at the scanning position for scanning; means for providing relative scanning motion between the document and an image data acquisition device; means for detecting light reflected from the document during relative motion and producing electronic signals indicative of sensed reflected light; and an output to which electronic signals are directed in an order suitable for printing, the improvement comprising:

means responsive to a signal from a controller for varying the order of the electronic signals so that orientation of an image on a document represented by the electronic signals is rotated by 180° when directed to the output;

means for designating to the controller that a bound set of documents is being scanned;

said controller directing said signal to said order varying means to rotate the image represented by the electronic signals for every other document in a set of documents scanned, upon designation to the controller that a bound set of documents is being scanned.

2. The system as defined in claim 1, wherein said order varying means includes:

said relative motion providing means operable to provide scanning motion in first and second opposite and parallel directions;

said means for detecting light reflected from the document during relative motion and producing electronic signals indicative of sensed reflected light, operable when said relative motion is in the first and in the second directions; and means for reversing the order of electronic signals from 1−N order as derived to N−1 order prior to direction to said output.

3. The system as defined in claim 2, wherein said relative motion providing means operable to provide scanning motion in first and second opposite and parallel directions includes a motor and a motor controller, said motor controller controlling said motor to provide said scanning motion in said first direction, and controlling said motor to provide said scanning motion in said second opposite direction responsive to the signal.

4. The system as defined in claim 2, wherein said order reversing means includes first and second buffers, the first buffer receiving a first set of electronic signals in 1−N order, and subsequently sending said first set of electronic signals in N−1 order, said sending of electronic signal occurring substantially simultaneously with the second buffer receiving a second set of electronic signals in 1−N order, said second buffer subsequently sending said second set of electronic signals in N−1 order, said sending of electronic signals occurring substantially simultaneously with the first buffer receiving a third set of electronic signals.

5. The system as defined in claim 1, wherein said means for designating to the controller that a bound set of documents is being scanned includes means for identifying that a first document has been placed at the scanning position, and means for identifying that a second document having an image surface opposed to said first has been placed at the scanning position.

6. The system as defined in claim 5, wherein said means for identifying that a first document has been placed at the scanning position, and means for identifying that a second document having an image surface opposed to said first has been placed at the scanning position includes an operator selectable identification of first document placement and second document placement.

7. The system as defined in claim 1, wherein said means for varying the order of the electronic signals so that orientation at the output of an image on a document represented by the sensed electronic signals is rotated by 180° includes:

means for storing the image derived from the document;

means for rotating the image on the document;

means for storing the rotated image.

8. In a document scanning system for deriving an electronic representation of an image on a document, provided with a scanning position having a book edge thereat accommodating a placement of a book for scanning, wherein for scanning opposed pages of a book, the book is placed with a single page at the scanning position for scanning, and subsequently manually rotated with respect to the scanning position for scanning an opposed page; means for effecting scanning of a document in a first direction at the scanning position with an array of photosensitive elements for detecting light reflected from the document and periodically producing a scan line of signals indicative of sensed reflected light, and an output to which electronic signals are directed in an order suitable for printing, the improvement comprising:

means for effecting a reversed direction of scanning, said reversed scanning responsive to a direction reversing command thereto from a controller to scan the opposed page;

means for reversing the order of signals in each scan line derived while scanning in the reversed direction, responsive to an order reversing command from said controller;

means for designating to the controller that a book is being scanned; and said controller acting upon designation of book scanning to direct a direction reversing command to said scanning direction reversing means and an order reversing command to said signal order reversing means, to rotate every other document image in a set of documents scanned.

9. The system defined in claim 8, wherein said scanning means operable to provide scanning motion in first and reversed directions includes a motor and a motor controller, said motor controller controlling said motor to provide said scanning motion in said first direction, and controlling said motor to provide said scanning motion in said reversed direction responsive to the direction reversing command.

10. The system as defined in claim 8, wherein said order reversing means includes first and second buffers, the first buffer receiving a first set of electronic signals in 1−N order, and subsequently sending said first set of electronic signals in N−1 order, said sending of electronic signal occurring substantially simultaneously with the second buffer receiving a second set of electronic signals in 1−N order, said second buffer subsequently sending said second set of electronic signals in N−1 order, said sending of electronic signals occurring substantially simultaneously with the first buffer receiving a third set of electronic signals.

11. The system as defined in claim 8, wherein said means for designating to the controller that a book is being scanned includes means for identifying that a first page has been placed at the scanning position, and means for identifying that an opposed page has been placed at the scanning position.

12. The system as defined in claim 11, wherein said means for identifying that a first page has been placed at the scanning position, and means for identifying that an opposed page has been placed at the scanning position includes an operator selectable identification of first document placement and second document placement.

13. An electrophotographic imaging device, having an imaging position at which a bound original document set may be supported for imaging, the bound document set having at least one first and second original documents with opposed image surfaces, and the imaging position supporting only a single original document thereof for imaging, whereupon for second original document scanning, the bound original document set is manually rotated with respect to the scanning position to place the second original document at the scanning position for scanning; an imaging member with a photoconductive surface; a charging device for charging the photoconductive surface to a uniform potential; imaging means for illuminating a document at the scanning position, and directing light reflected therefrom to the surface to form at a first orientation a latent image of charged and discharged areas thereon; development means for developing the latent image with toner, and transfer means to transfer the toner in imagewise fashion to another surface; the imaging means further comprising:

optical image rotation means, for rotating orientation of an original image with respect to a first orientation, said rotation means interposed between said original documents and the photoconductive surface, and having a first condition passing light reflected from the original documents to the photoconductive surface to form a latent image at a first orientation and having a second condition passing light from the original documents to the photoconductive surface to form a latent image at a second orientation;

means for designating to a control means that a bound set of documents is being scanned; and said control means varying said rotation means from said first condition to said second condition for every other document in a set of documents scanned, upon designation to the controller that a bound set of documents is being scanned.

14. A device as defined in claim 13, wherein said optical image rotation means includes a dove prism.

15. A device as defined in claim 14, wherein said dove prism is rotatable about an axis by preselected increments, between first and second conditions, each increment rotating the orientation between first and second orientations.

16. A device as defined in claim 15, wherein said dove prism is rotatable about an axis by preselected increments of 90°.

* * * * *